United States Patent Office 3,152,064
Patented Oct. 6, 1964

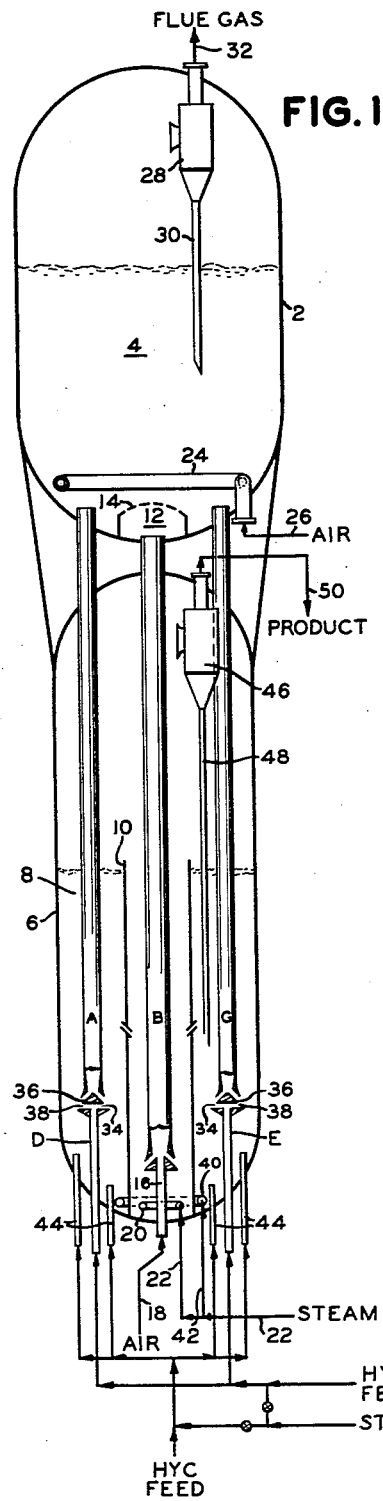
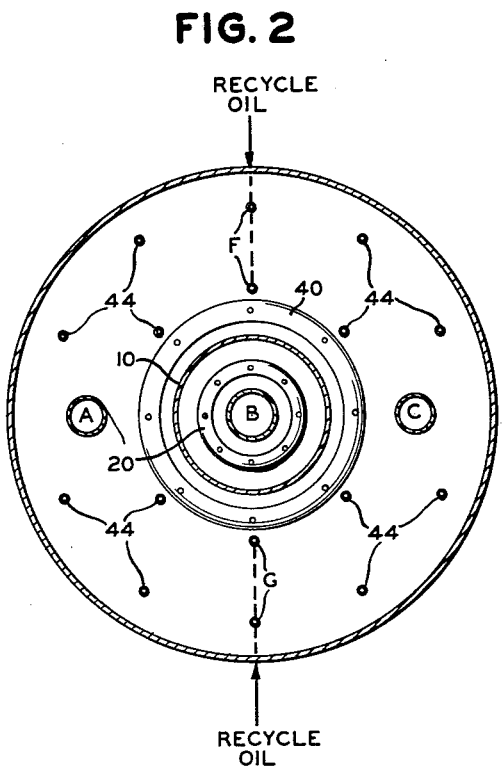

3,152,064
METHODS AND MEANS FOR CRACKING
HYDROCARBONS
John B. Osborne, South Orange, N.J., assignor, by mesne assignments, to Pullman Incorporated, a corporation of Delaware
Filed Jan. 15, 1959, Ser. No. 786,988
2 Claims. (Cl. 208—78)

This invention relates to an improved method and means for contacting a reactant material with finely divided contact material. In one aspect it relates to an improved method for introducing dissimilar hydrocarbon reactant materials in contact with finely divided catalytic material in a reaction zone.

The orthoflow design for contacting finely divided catalytic material with reactant material is a unitary system or structure in which one processing vessel is superimposed on the other and circulation of catalytic material is essentially through substantially vertical conduits interconnecting the separate vessels. This arrangement of processing vessels is unique in that it minimizes cost of fabrication, minimizes catalyst inventory but enhances the heat balance of the process. However, even with these improvements the engineer is constantly striving to increase the efficiency and versatility of the apparatus and process effected therein.

It is an object of this invention to provide an improved method and means for effecting the conversion of reactant materials in a fluidized system.

Another object of this invention is to provide a novel and improved method for contacting one or more reactant materials with finely divided contact material in a fluid system.

Still another object of this invention is to more effectively utilize the available heat in a unitary orthoflow system.

Other objects and advantages of this invention will become apparent from the following description and explanation.

This invention is directed to a novel and improved method and means for passing dissimilar reactant materials in contact with finely divided catalytic material. That is, an orthoflow system is provided which comprises a unitary vessel having an upper regeneration chamber and a lower reaction chamber, a stripping chamber open at its upper end extending upwardly from the bottom of the reaction chamber to above the upper level of a bed of finely divided catalytic material therein, a riser conduit extending from the lower portion of the stripping chamber upwardly into the bottom of the regeneration chamber and terminating in a catalyst distribution chamber in the lower portion of the regeneration chamber, at least one standpipe extending from the bottom of the regeneration chamber downwardly into the lower portion of the reaction chamber, a vertically movable hollow stem plug valve aligned with the bottom of said riser conduit for introducing a gaseous material for flow upwardly therethrough, a vertically movable hollow stem plug valve aligned with the bottom of said standpipe for contacting a first reactant material with catalyst immediately upon discharge from said standpipe and a plurality of nozzle means in the lower portion of the reaction chamber for simultaneous introduction of similar and/or dissimilar reactant material to the lower portion of the bed of catalyst in the reaction chamber.

In accordance with one aspect of this invention employing an orthoflow system herein described, a fresh feed or a relatively low-boiling hydrocarbon reactant material suitable for a catalytic cracking operation is commingled with hot freshly regenerated catalyst immediately upon discharge of the catalyst into the reaction zone whereby the fresh feed material is cracked in the presence of fresh catalyst and under maximum reactor temperature cracking conditions to desired products thereby contaminating the catalyst with products of reaction and partially cooling the catalyst. A second hydrocarbon feed material which may be of the same or higher boiling range than the first feed material is then introduced into the catalyst bed below the point of introduction of the first feed material for conversion into desired products at a reduced temperature but for a much longer period of contact time with the catalyst whereby the catalyst is further contaminated with volatile and nonvolatile reaction products. A portion of the contaminated catalyst is continuously withdrawn from the reaction zone and passed to the stripping zone wherein volatile products of reaction are stripped from the catalyst by passing the catalyst downwardly through the stripping zone countercurrent to stripping gas introduced to the lower portion thereof. Generally the temperature in the stripping zone will be higher than the average temperature in the reaction zone but may be controlled within the range of from about 0° F. to about 50° F. higher, preferably at least 20° F. higher. The stripping zone is provided with slots or passageways in the wall of the zone for the passage of catalyst from the reaction zone thereto. These catalyst transfer slots or passageways are usually fixed unrestricted passageways positioned in the intermediate portion of the stripping well, which location permits withdrawal of contaminated catalyst from the reaction zone when varying the catalyst bed height over a wide range. For example, the catalyst bed, which is an annular bed in the specific illustration, may be varied from about 10 to about 30 feet in height, depending upon the severity of treatment desired and time of contact of the reactant material with the catalyst. Accordingly, when employing a minimum bed height in the reactor, the catalyst will be withdrawn from the upper portion of the bed for passage in the stripping zone and when employing a maximum bed height the catalyst will be withdrawn from an intermediate portion of the bed.

The stripped catalyst is withdrawn from the lower portion of the stripping zone, mixed with a portion of the oxygen containing gas required to regenerate the catalyst, which may be from about 5 to about 50 percent of the oxygen required, and passed upwardly through the substantially vertical riser conduit into the lower portion of the regeneration zone. Additional oxygen containing regeneration gas, which may be air or an inert gas containing oxygen, is introduced into the lower portion of the regeneration zone to complete the regeneration of the catalyst by burning of carbonaceous deposits with catalyst. Generally the regenerator will be operated at a temperature in the range of from about 1050° F., to about 1250° F., and preferably about 1125° F. During the regeneration step the catalyst becomes heated to an elevated temperature and a portion of the regenerated catalyst at an elevated temperature is withdrawn from the lower portion of the regeneration zone and passed downwardly through one or more standpipes to the reaction zone. As herein discussed, the fresh feed contacts the freshly regenerated catalyst immediately upon discharge of the catalyst from the standpipe. Under these conditions, the fresh feed is cracked at a temperature in the range of from about 950° F. to about 1050° F., preferably about 975° F., and the catalyst in the area around the standpipe is at a higher temperature than the catalyst in the remaining portion of the bed. As a result of the first contact of fresh feed with the hot regenerated catalyst, the catalyst is reduced in temperature and distributes itself in the remaining portion of the bed of catalyst. The second hydrocarbon reactant is then introduced to the lower portion of the bed wherein it is subjected to cracking under reduced temperature conditions in the range of from about 850° F. to about 1000° F., and preferably about 900° F., for a longer period of contact time than the fresh feed material. When employing two or more catalyst standpipes and a recycle oil as the second hydrocarbon feed material, the recycle oil is introduced to the catalyst bed area intermediate of the standpipes.

As hereinbefore indicated, this invention is directed to a novel and improved arrangement for introducing oil feed material to a bed of catalyst. This is accomplished in one embodiment by introducing all of the fresh feed material through a hollow stem plug valve aligned with the regeneration catalyst standpipes whereby the hot freshly regenerated catalyst initially contacts the fresh feed under elevated temperature cracking conditions and thereafter the catalyst is contacted with a second feed material such as a recycle oil feed material at a lower temperature in another portion or quadrant of the annular catalyst bed. By this arrangement relatively low boiling products of the fresh feed are almost immediately swept out of the catalyst bed before overcracking occurs due to the circulation of the catalyst upwardly around the standpipe. Accordingly in an annular fluidized bed of finely divided catalyst there is provided a temperature gradient in the catalyst bed such that the quadrant of the catalyst bed or area adjacent to the standpipes is the high temperature area with the intermediate area or quadrant between the standpipes being at a relatively lower temperature to which a relatively high boiling feed material is introduced.

Although applicant has not shown a physical separation of the annular bed of catalyst into quadrants by vertical baffle member, it is to be understood that such an arrangement is contemplated within the scope of this invention. When employing such vertical baffle members, provisions are made for transferring catalyst from the high temperature fresh feed cracking portion of the bed to the relatively low temperature cracking portion of the bed through suitable slots means or passageways in the baffle. Instead of the baffle members being partitions which extend from the bottom of the vessel to above the upper level of the catalyst bed, the baffle members may be in the form of cylindrical wells closed at the bottom which surround the lower portion of the standpipe and extend upwardly in the catalyst bed to below the upper level thereof. In this arrangement the catalyst is contacted with fresh feed flowing upwardly around the standpipe and thereafter the catalyst passes into the fluidized catalyst bed in the remaining portion of the reaction zone. In the preferred embodiment, the annular bed is not segregated with baffle members since without the baffles applicant is provided with a more versatile apparatus and method of operation for contacting catalyst with hydrocarbon feed material. For example, applicant may introduce fresh feed through a plurality of hollow stem plug valves aligned with a plurality of standpipes, as well as the feed nozzles in the bottom of the bed with and/or without recycle oil. In another embodiment, applicant may split the fresh feed such that a portion of the fresh feed either of the same or different boiling range may be introduced through the hollow stem plug valve with the remaining portion introduced to the lower portion of the catalyst bed through the feed nozzles in the area of the standpipes with recycle oil introduced through one or more nozzles in the area intermediate of the standpipes. It is also contemplated, within the scope of this invention, terminating the standpipes with or without the baffle means herein discussed in the upper portion of the fluidized bed of catalyst, for example, the upper half or third of the catalyst bed such that the fresh feed may be converted in the upper portion of the catalyst bed with a higher boiling material such as recycle oil or the high boiling fraction of the fresh feed introduced to the bottom or lower portion of the catalyst bed. In all of these embodiments, it is significant to note that the fresh feed or least refractory material is introduced in the area of greatest catalyst activity and highest temperature with the most refractory or high boiling feed material introduced into the area of lowered catalyst activity and temperature. To facilitate fluidization of the catalyst in the lower portion of the annular reaction zone, dispersion steam is mixed with the oil feed in an amount ranging from about 0.1% to about 5% by weight. The dispersion steam acts to diffuse or break the oil into small particles for more intimate mixing and contact with the catalyst and also serves to maintain a high velocity flow through the feed injection nozzles in case of stoppage of the oil flow. Generally, the feed nozzles will employ an oil velocity of from about 5 to about 25 feet per second, preferably about 8 feet per second, and a steam velocity of from about 20 to about 200 feet per second, preferably about 52 feet per second, giving a combined velocity of about 60 feet per second. Provision is also made for introducing additional inert fluidizing gas beneath and external to the feed nozzles in the lower portion of the bed to prevent defluidization of the catalyst.

The hollow stem plug valves used in the process and apparatus of this invention may be of any suitable design which will permit contacting of the fresh hydrocarbon feed with the hot regenerated catalyst immediately upon discharge of the catalyst from the base of the standpipe. It is important, however, when the plug valve is closed to stop discharge of catalyst from the standpipe that the oil discharge ports or nozzles associated with the plug valve be so positioned with respect to the conical plug of the valve that they are below the lower lip of the standpipe to prevent discharging hydrocarbons into the standpipe. In addition, it is preferred from the standpoint of plug erosion that the oil be discharged substantially tangentially with respect to the annular flow of catalyst over the conical plug of the valve assembly. This introduction of the hydrocarbon feed tangentially is not essential and may be at any angle since the primary purpose is to obtain intimate mixing and contact of the hydrocarbon feed with the hot freshly regenerated catalyst immediately after or just as it is discharged from the standpipe.

The catalyst or finely divided contact material employed in this invention is composed of particles less than 250 microns in size, more usually, the particles will be in a range of from about 10 to about 100 microns in size. The cracking catalyst to be employed in this invention may be a siliceous material comprising from about 70 to about 90 percent by weight of silica with the remainder being one or more of other suitable materials such as alumina, boria, magnesia, zirconia or the like.

Hydrocarbon feed materials which are especially suitable for use in the initial contact step with freshly regenerated catalyst may have an initial boiling point of about 400° F. to about 700° F., an end point of about 700° F. to about 1300° F., and an API gravity in the range of from about 10 to about 40°, these hydrocarbons being for example, gas oils, reduced crudes, residual oils, heavy distillates and the like or fractions of these hydrocarbon materials. The secondary feed material, as herein described, may be high boiling fractions of the above feed materials as well as a cycle oil having an initial boiling point of from about 400° F. to about 700° F., an end point of from about 800° F. to about 1400° F., and an API gravity of from about 5 to about 35°.

Having thus generally described the improved method and means of this invention, reference will now be had to the accompanying drawings which are diagrammatic illustrations of an apparatus arrangement for carrying out a preferred modification of this invention. It will be understood, however, that the invention is not limited in scope to the specific modification herein discussed, but includes in its scope other modifications and apparatus thereof embodying the principle of the invention.

FIGURE 1 represents in diagrammatic elevation an arrangement of apparatus for effecting a preferred method of contacting reactant materials with finely divided contact material.

FIGURE 2 represents diagrammatically a cross-sectional view of the reactor section of FIGURE 1.

Referring now by way of example to FIGURE 1, a unitary vessel is provided having an upper regenerator chamber 2 containing a dense fluid bed of catalytic material 4 and a lower annular reactor chamber 6 containing a dense fluid bed of catalytic material 8. A cylindrical stripper chamber defined by walls 10, open at its upper end and coaxially positioned in the vessel extends from the bottom of the reactor chamber upwardly into the upper portion thereof. A riser conduit "C" coaxially positioned in the stripper chamber extends from the lower portion of the stripping chamber substantially vertically upwardly into the bottom of the regenerator chamber and terminates in a distributing chamber 12 provided with perforated grid 14. Instead of using chamber 12, the riser conduit may be extended a short distance upwardly into the regenerator, capped and provided with a plurality of elongated slots around its upper periphery for discharge of catalytic material from the riser into the bed 4. A vertically movable hollow stem plug valve 16 is aligned with the base of riser "C" for the introduction of lift gas such as air through conduit 18 for flow upwardly through the riser and simultaneously effected partial regeneration of the catalyst. Annular distributor ring 20 is positioned in the lower portion of the stripping chamber for the introduction of stripping gas such as steam thereto by conduit 22. Additional regeneration air is introduced to the lower portion of the catalyst bed 4 by annular distributing rnig 24 supplied by conduit 26. In the riser "C" and regenerator chamber 2, carbonaceous material is removed from the catalyst by burning thereby heating the catalyst to an elevated temperature with the products of combustion passed through cyclone separator 28 having dipleg 30 for the return of catalyst separated from the flue gas to the bed 4. Flue gas is then removed from the cyclone by conduit 32. During the regeneration step the catalyst becomes heated to an elevated temperature and the thus heated catalyst is used to supply the major portion of the endothermic heat required in the cracking of hydrocarbons. Accordingly standpipes "A" and "B" are provided for transferring freshly regenerated catalyst at an elevated temperature from the lower portion of the regeneration zone to the reaction zone. In this specific embodiment two standpipes, diametrically opposed, are employed for transferring regenerated catalyst at an elevated temperature to opposite portions of the annular reaction chamber containing catalyst bed 8. Aligned with the bottom open discharge end of the standpipes are vertically movable hollow stem plug valve assemblies "D" and "E" provided with solid conical plug members 36 on the upper end of the hollow valve stem. A plurality of nozzles or ports 38 in open communication with the hollow valve stem circumscribe the lower portion of the conical plug member for radially discharging a reactant material into the annular stream of catalyst flowing down from the conical plug means.

Considering now FIGURE 2 in conjunction with FIGURE 1, FIGURE 2 shows diagrammatically in cross-section an arrangement of inlet nozzles projecting upwardly into the bottom or lower portion of the reactor chamber, standpipes "A" and "B," riser conduit "C," the cylindrical stripping chamber defined by wall 10, annular ring 20 for the introduction of stripping gas to the lower portion of the stripping chamber and an annular distributing ring 40 for the introduction of fluidizing gas, such as steam, to the lower portion of the reactor chamber connected to conduit 42. A plurality of feed nozzles 44 uniformly spaced across the cross-sectional area of the reactor chamber are provided for the introduction of a portion of the fresh feed or a high boiling portion thereof into the lower portion of the fluid bed of catalyst maintained in the reactor chamber. In addition, feed nozzles "F" and "G," diametrically opposed and positioned about 90 degrees apart from standpipes "A" and "B," are provided for the introduction of a more refractory hydrocarbon feed material such as recycle oil. Of course feed nozzles "F" and "G" are not limited to the introduction of recycle oil alone and any portion of the fresh feed with or without recycle oil may be introduced through these nozzles. However, when recycle oil is introduced to the catalyst bed, it will be introduced through nozzles "F" and "G." Provisions are also made, as shown by FIGURE 1, for adding steam to any one of the hydrocarbon feed materials introduced to the catalyst bed for the reasons hereinbefore discussed.

The combined products of the separate feed materials introduced to the reactor chamber and stripped products of reaction are removed and passed to a suitable cycle separator 46 for the removal of entrained catalyst fines from the reaction products. The separated fines are returned to catalyst bed 8 by dipleg 48 with the products of reaction recovered by conduit 50 for transfer to suitable recovery equipment not shown.

Having thus specifically described a preferred embodiment of this invention, reference is now had to the following examples which set forth a specific method of operation.

EXAMPLE I

This example sets forth the catalyst inventory employed in the specific apparatus shown and disclosed herein.

*Catalyst Inventory (U.S. Tons)*

|  | Normal Operation | Maximum Operation |
| --- | --- | --- |
| Reactor Sect | 106 | 136 |
| Stripper Sect | 28 | 41 |
| Total Reactor | 134 | 177 |
| Regenerator Sect | 193 | 290 |
| S. C. Riser | 1 | 1 |
| Reg. Cat. Standpipes | 4 | 7 |
|  | 332 | 475 |

EXAMPLE II

This example illustrates the operating conditions suitable for use in the fluid catalytic cracking system of this invention adapted to process 11,053 b.p.s.d. of fresh feed having an API gravity of 29.8° and 7,730 b.p.s.d. of recycle oil having an API gravity of 21.0°.

*Regenerator*

Working pressure, top _____ 9.8 p.s.i.g.
Working pressure, bottom _____ 12.1 p.s.i.g. (normal).
Working temperature (normal) __ 1100° F.
Working temperature (maximum) 1150° F.
Catalyst density (normal) _____ 30 #/cu. ft.
Catalyst density (maximum) _____ 45 #/cu. ft.
Standpipe catalyst density _____ 40 #/cu. ft.
Standpipe catalyst velocity _____ 4.7 ft./sec.
Standpipe diameter (I.D.) _____ 20 inches.

*Reactor*

Working pressure, top _____ 15.4 p.s.i.g.
Working pressure, bottom _____ 21.0 p.s.i.g. (normal).
Working temperature _____ 900° F.–1000° F.
Catalyst density (normal) _____ 35 #/cu. ft.
Catalyst density (maximum) _____ 45 #/cu. ft.
Space velocity w./hr./w. _____ 1.29.
Catalyst/oil (average) _____ 9.0.
Catalyst circulation (tons/min.) _ 18.4.

*Stripper*

Working temperature _____ 900° F.
Catalyst density (normal) _____ 30 #/cu. ft.
Stripping steam _____ 11,100 #/hr.

*Riser*

Riser diameter (I.D.) _____ 34 inches.
Space velocity _____ 40.5 ft./sec.
Catalyst density _____ 4.84 #/cu. ft.

It will become obvious to those skilled in the art from the description that many modifications may be made

Having thus described my invention, I claim:

1. A method for the catalytic cracking of dissimilar hydrocarbon reactant materials which comprises maintaining an annular fluid bed of finely divided catalytic material in a reaction zone, introducing at least two separate streams of freshly regenerated catalyst at an elevated temperature into opposite quadrants of said annular bed of catalyst, spraying said freshly regenerated catalyst immediately upon introduction into said annular bed with a first hydrocarbon reactant reactant to effect cracking thereof into desired products at maximum temperature conditions existing therein, passing a second hydrocarbon reactant into the same quadrants but in a lower portion of said annular bed than the point of introduction of said freshly regenerated catalyst to effect cracking thereof under less severe temperature cracking conditions than said first cracking step, introducing a third hydrocarbon reactant more refractory than either of the first two hydrocarbon reactants into the lower portion of the annular catalyst bed intermediate of the point of introduction of said freshly regenerated catalyst to effect cracking thereof into desired products and withdrawing combined products of said cracking steps from the upper portion of said reaction zone.

2. A unitary apparatus comprising in combination, an upper regeneration chamber, a lower reaction chamber, a stripping chamber open at its upper end extending upwardly from the lower portion of said reaction chamber to the upper portion thereof, a riser conduit extending from the lower portion of said stripping chamber upwardly into said regeneration chamber, a hollow stem plug valve aligned with the bottom of said riser conduit for the introduction of gaseous material and flow upwardly through said riser conduit, at least one standpipe conduit extending from the bottom of said regeneration chamber to the lower portion of said reactor chamber for downward flow of finely divided contact material therethrough, a hollow stem valve assembly having a solid conical plug means on the upper end thereof aligned with the bottom open end of said standpipe to divert downwardly flowing contact material as an annular stream into said reactor chamber, said valve assembly provided beneath said solid conical plug means with a plurality of vaporous material discharge outlet directed toward the annular stream of contact material discharged from said standpipe, a plurality of spread apart nozzle means across the cross-sectional area of said reaction chamber for the controlled introduction of reactant material therethrough, means for introducing a gaseous material to the lower portion of said reactor chamber beneath said spaced apart nozzle means, means for introducing a gaseous material to the lower portion of said stripping chamber and means for removing a gaseous material from the upper portion of each of said reactor and regenerator chambers.

References Cited in the file of this patent

UNITED STATES PATENTS

| | | |
|---|---|---|
| 2,433,726 | Angell | Dec. 30, 1947 |
| 2,459,824 | Leffer | Jan. 25, 1949 |
| 2,891,001 | Wickham et al. | June 16, 1959 |
| 2,883,332 | Wickham | Apr. 21, 1959 |
| 2,900,324 | Patton et al. | Aug. 18, 1959 |
| 2,900,325 | Rice et al. | Aug. 18, 1959 |
| 2,948,673 | Hemminger | Apr. 9, 1960 |
| 2,956,004 | Conn et al. | Oct. 11, 1960 |
| 2,958,653 | Kruse | Nov. 1, 1960 |
| 2,967,145 | Garihan et al. | Jan. 3, 1961 |